UNITED STATES PATENT OFFICE.

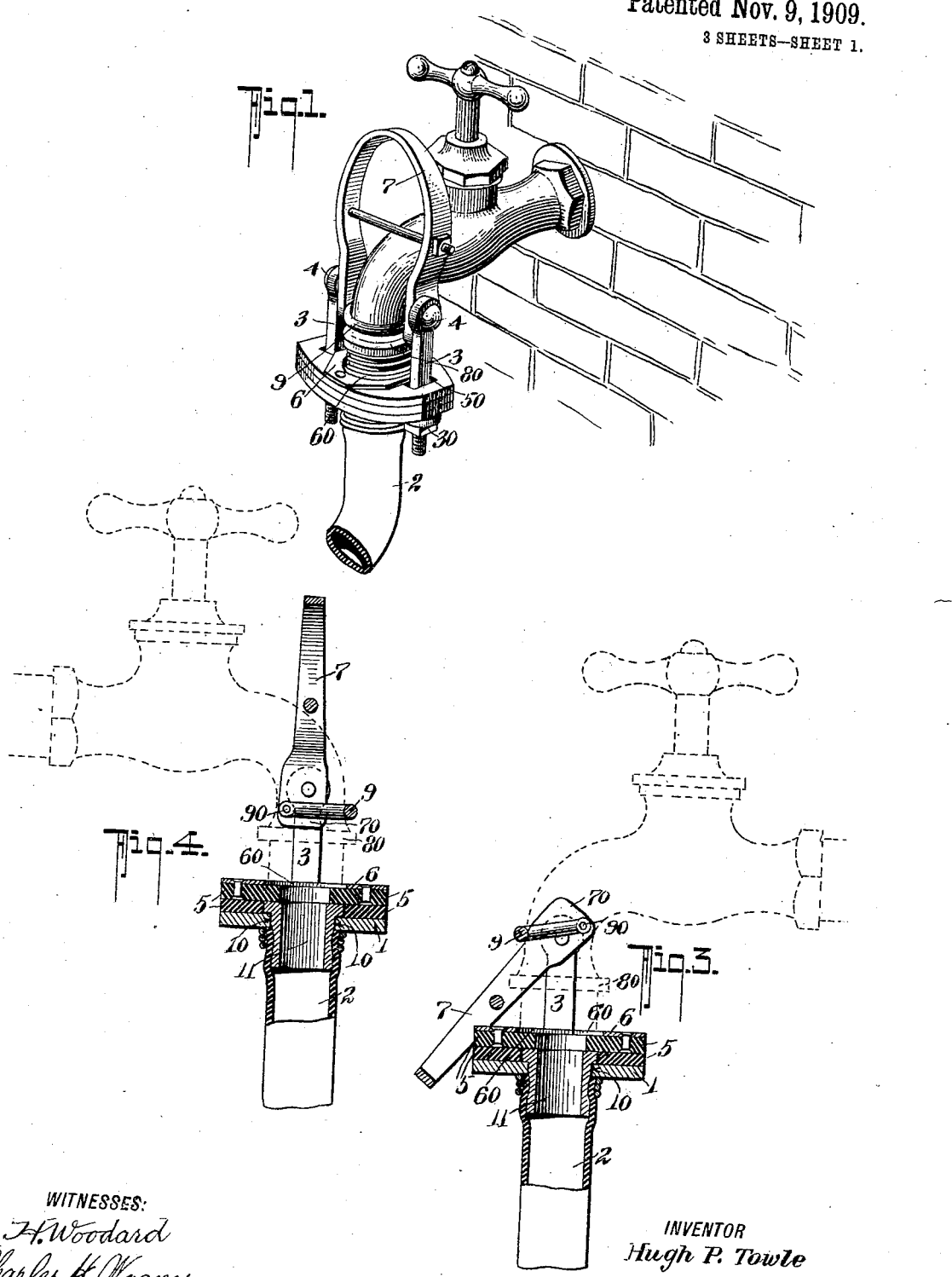

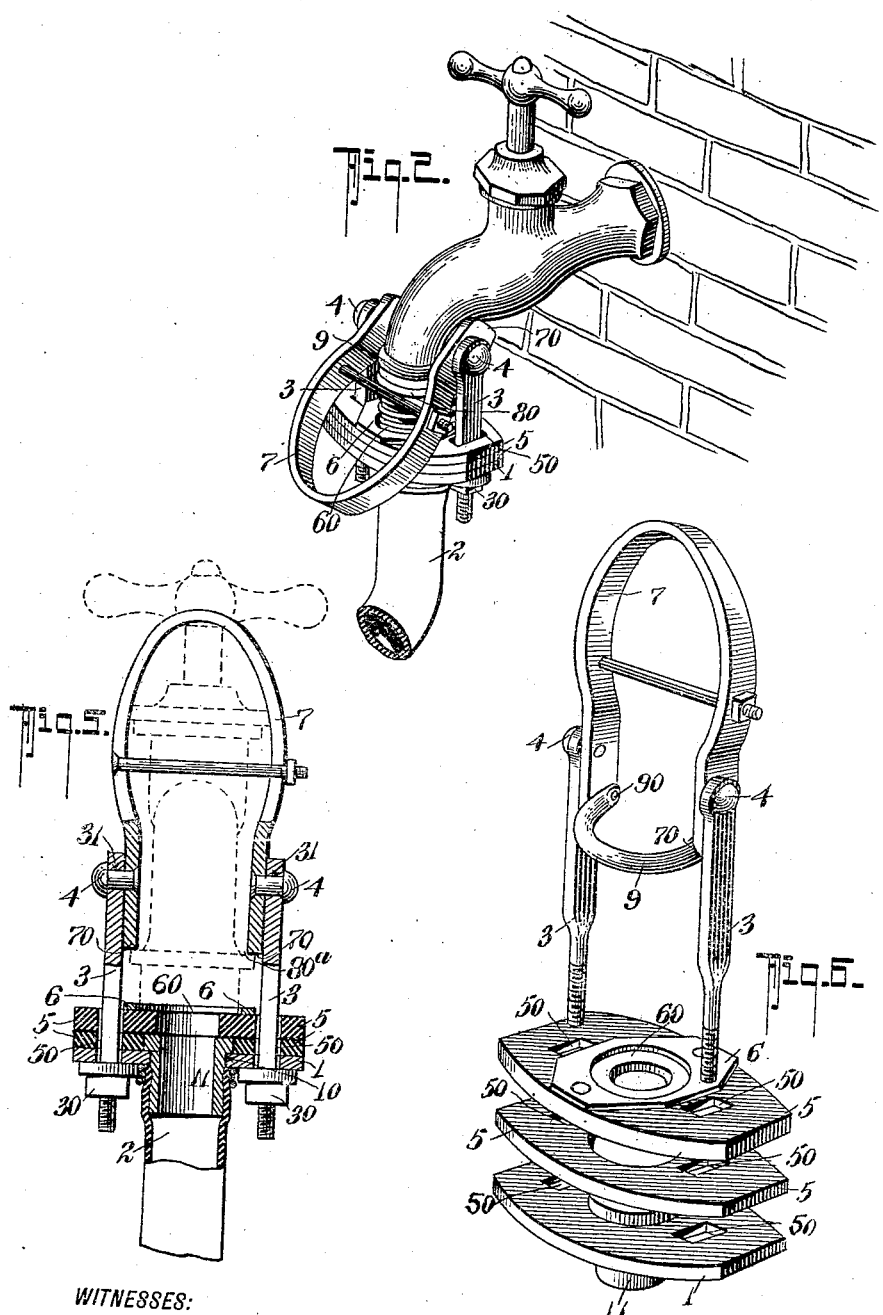

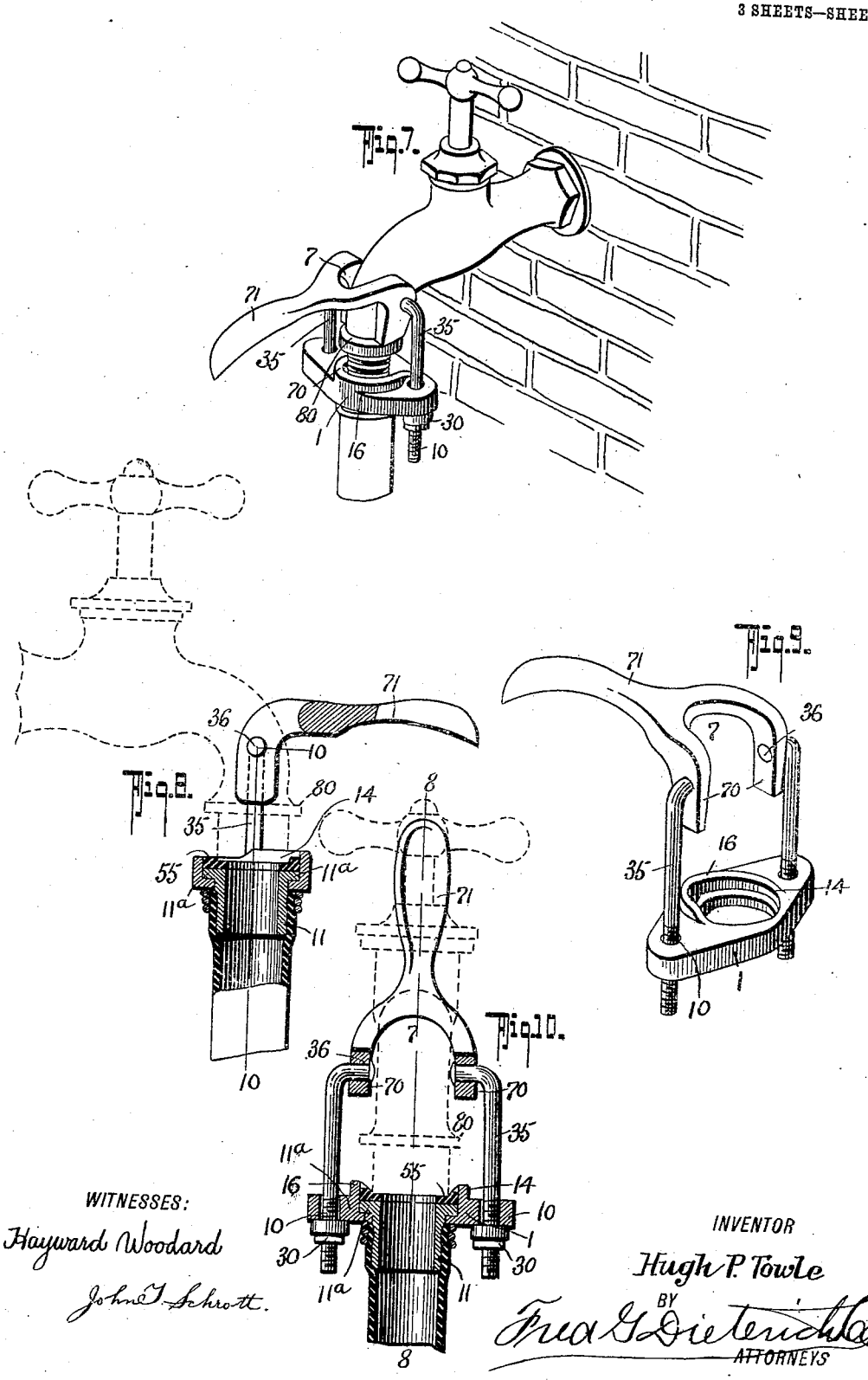

HUGH P. TOWLE, OF SAN JOSE, CALIFORNIA, ASSIGNOR OF FIVE-EIGHTHS TO JOHN H. McGEHEE, OF SAN JOSE, CALIFORNIA.

FAUCET AND HOSE COUPLING.

939,931.          Specification of Letters Patent.          Patented Nov. 9, 1909.

Application filed November 25, 1908. Serial No. 464,496.

*To all whom it may concern:*

Be it known that I, HUGH P. TOWLE, residing at San Jose, in the county of Santa Clara and State of California, have invented certain new and useful Improvements in Faucet and Hose Couplings, of which the following is a specification.

My invention relates to improvements in that type of coupling or connector means especially adapted for joining a hose with the ordinary form of faucet, and it primarily has for its object to provide a means of the character stated of a simple and economical construction, readily joined watertight with the end of a hose and that can be almost instantly applied to or removed from the faucet and held in such manner that the hose will be firmly clamped up against the faucet end.

With the above objects in view my invention, in its general nature, comprehends a nipple plate, to which the end of the hose can be firmly connected, a yoke mounted on the plate and formed to readily straddle over the discharge or goose-neck of the faucet, a supplemental yoke mounted on the other yoke eccentrically with respect to the fulcrums of said other yoke, for tightly fitting against the goose-neck of the faucet and cam portions on the main yoke for engaging abutment surfaces on the faucet, the several parts being so arranged that after fitting the main plate against the mouth of the faucet, turning the main yoke up against the faucet effects a clamp locking of the coupling to the faucet, a backward turn of the main yoke releasing it from the said faucet.

In its more complete nature my invention comprises a nipple plate to which the hose end is attached, standards projected therefrom and having adjustment thereon; a main yoke frame pivotally mounted in the said standards, and having eccentric or cam bearing portions for engaging abutting surfaces in the faucet, a supplemental yoke mounted in the cam formed ends of the main yoke, washers of yielding material mounted on the nipple plate, and other details of construction and peculiar combination of parts forming subordinate features of my invention, all of which will be hereinafter fully explained, specifically pointed out in the appended claims and illustrated in the accompanying drawings, in which:

Figure 1, is a perspective view of my invention, and showing the same as coupling the hose section with the faucet. Fig. 2, is a similar view, the coupling being shown as mounted on the goose-neck of the faucet but not locked thereon. Fig. 3, is a vertical longitudinal section of the coupling, the parts being in the position shown in Fig. 2, and the faucet shown in dotted lines to the better disclose the relation of the cam ends of the main yoke and the faucet abutments or locking shoulders. Fig. 4, is a similar view, the parts being as shown in Fig. 1. Fig. 5, is a transverse section of the parts shown in Fig. 4. Fig. 6, is a perspective view that illustrates the several parts that constitute my complete coupling device, separated. Fig. 7, is a perspective view that illustrates a modified form of my invention hereinafter fully described. Fig. 8, is a vertical section of the same on the line 8—8 of Fig. 10. Fig. 9, is a perspective view of the clamping members shown in Fig. 7. Fig. 10, is a vertical section thereof taken substantially on the line 10—10 of Fig. 8.

In the practical construction, my invention comprises a main plate 1, having a central aperture 10, in which is mounted a short metal pipe section 11 that forms a nipple, its upper end having an annular flange that holds it from pulling through the plate 1, and whose lower portion is shaped for securely fastening the end of the hose 2, as clearly shown in Fig. 3. At the opposite ends the plate 1 has apertures 50—50 in each of which loosely plays a standard 3, the lower ends of which are threaded to receive the adjusting nuts 30, the upper ends of the said standards being apertured as at 31, to receive the fulcrum or stud pins 4—4 presently again referred to.

5—5 designate one or more packing washers, apertured at their opposite ends, as at 50, so they are freely movable on the standards 3 that pass therethrough. To form a guide for fitting the coupling to the nozzle mouth, the uppermost packing 5 has a metal reinforce plate 6, formed with a large opening 60, the edge of which acts as the guide for fitting the device onto the nozzle end. It should be stated the washers 5, form as it were, an expansible body to provide for a water-tight connection when the coupling device is clamped on the faucet end, as will be readily understood by referring to Fig. 3, of the drawings.

7 designates a yoke hereinafter termed the main yoke member, the ends of which are pivotally mounted on the studs 4—4 and the ends of the said yoke 7 at the lower edge are formed with curved clamping portions 70 disposed eccentrically with respect to the studs 4 and these portions are provided to engage with the projecting rim 80 of the faucet at the discharge end.

In cases where the faucets have no positive rim edge at the discharge end the opposite sides of the faucet are filed away to form the desired abutment, or locking edges 80$^a$, as clearly shown in Fig. 5.

In the ends of the main yoke 7 is pivotally mounted a smaller supplemental yoke 9, which has for its purpose to straddle the faucet and close against the same when the coupling is applied, and it forms a supplemental pivotal bearing for the main yoke and serves to relieve the stud bolts 4—4 of too great a strain during the operation of clamping the coupling to the faucet, it also serves to facilitate the application of the device since it prevents undue bending of the cam ends on the shoulders or abutments 80$^a$ the studs 90 that join the yokes 9—9 also acting as pivotal bearings for the yoke 6 during the first part of its movement in the direction of the arrow X in Fig. 2, and thereby causes the upper ends of the standards 3 to incline inwardly from the vertical, see Fig. 3, to effect a positive locking of the cam ends on the shoulders 80$^c$ and thereby hold the hose end water-tight against the nozzle end. The supplemental yoke 9 also aids in quickly disconnecting the coupling since in swinging the main yoke down the lower ends move inwardly and draw the yoke 9 against the faucet neck and as the said yoke 9 is held from movement the yoke 7 turns on the studs 9 and swings the studs 4 with the standards 3 forwardly and thereby effects a quick unlocking of the several parts.

From the foregoing taken in connection with the accompanying drawings the complete construction, the manner in which my invention is used and its advantages will be readily apparent. It will be noticed to apply the same, it is only necessary to fit the nipple plate with its yielding face under the faucet mouth, see Fig. 2, and then slip the ends of the main yoke over the shoulders 80 of the faucet, and then quickly swing up the yoke 7. To release the same, it is only necesssary to swing the yoke 7 down. By having adjustable standards for the main yoke 7, the said yoke can be readily adjusted for different sizes of faucets and those with short or long necks.

A modified construction of my invention is shown in Figs. 7 to 10, inclusive, in which the same general arrangement of the main plate, the locking yoke or member and the standards that carry the said member shown in the preferred construction, shown in Figs. 1 and 2, is embodied. In the said modified form the main plate has an annular socket 14 in its upper face that surrounds the central opening therein, forming a seat to receive the flanged head 11$^a$ of the tubular coupling plug 11 and a cushion washer 55, best shown in Figs. 8 and 10. The plate 1 at the upper side is also formed with a semicircular flange 16 that acts as a guide or a stop when fitting the device to the flanged end of the faucet, as will be clearly understood from Figs. 7 and 8. In the modified form the standards are in nature of stout rods 35, the lower threaded ends of which have free play in the apertures 10 of the main plate 1 and carry the clamp nuts 30, and whose upper ends are bent inwardly to form the pivot studs 36—36 for the clamp yoke 7 which has the ends 70—70 for locking against the flange 80 of the faucet, the said yoke member in the form shown in Figs. 7 to 10 having a solid handle-like extension 71.

What I claim is:

1. A hose and faucet coupling device, comprising a nipple plate having a yielding bearing face adapted to be fitted against the mouth of the faucet, standards adjustably mounted on said nipple plate, a yoke pivotally mounted on the standards to straddle the forward end of the faucet, the ends of said yoke having locking edges eccentric to its fulcrum for engaging the rim edges of a faucet having a rim surrounding its mouth.

2. In combination with a faucet having bearing shoulders at the opposite sides; a plate having a nipple for a hose connection, standards passing through said plate and projected from said plate, adjustable devices carried by said standards for engaging said plate, a yoke pivotally mounted on the standards to straddle the faucet, the ends of said yoke having cam-like portions for engaging shoulders on a faucet.

3. A hose and faucet coupling device, comprising a nipple plate having yielding bearing surface to engage the mouth edge of a faucet, standards mounted on the plate, a yoke pivotally mounted on the standards and adapted for straddling the outer end of the faucet, said yoke having its ends formed with cam-shaped locking portions, for engaging shoulders on a faucet, and a supplemental yoke member pivotally mounted on the extreme ends of the other yoke member.

4. A hose and faucet coupling device, comprising a nipple plate having a yielding bearing face to engage the mouth edge of a faucet, standards adjustably mounted on the said plate, a yoke pivotally mounted between the standards to straddle the outer end of the faucet, the ends of the said yoke having locking edges eccentric to the yoke fulcrums for engaging the rim edge of a faucet having a rim adjacent to its mouth.

5. A hose and faucet coupling device comprising a nipple plate having a yielding bearing face, standards adjustably mounted on the plate, a yoke pivotally mounted between the standards, the outer ends of the yoke having locking edges eccentric to the fulcrum of the yoke, and a supplemental yoke pivotally mounted between the extreme ends of the other yoke.

6. The combination with a faucet having oppositely disposed bearing shoulders; of a nipple plate to which the hose attaches, standards projected from the plate and adjustably mounted thereon, packing pieces mounted on the plate and standards, a main yoke fulcrumed in the upper ends of the standards, the ends of the said yoke being formed with cam-like locking edges for engaging the bearing shoulders on the faucet, and a supplemental yoke pivotally mounted on the cam-shaped ends of the main yoke.

HUGH P. TOWLE.

Witnesses:
  Geo. D. Smith,
  Chas. Herrmann.